United States Patent [19]

Heilemann

[11] 3,948,247

[45] Apr. 6, 1976

[54] SOLAR HEAT-COLLECTOR DEVICE

[76] Inventor: Volkman Heilemann, 127 Mountainview Road, Warren Township, N.J. 07060

[22] Filed: May 12, 1975

[21] Appl. No.: 576,294

[52] U.S. Cl. ............................................. 126/271
[51] Int. Cl.² ........................................... F24J 3/02
[58] Field of Search ............................ 126/270, 271

[56] References Cited
UNITED STATES PATENTS

| | | | |
|---|---|---|---|
| 1,855,815 | 4/1932 | Abbot | 126/271 |
| 1,946,184 | 2/1934 | Abbot | 126/271 |
| 3,012,294 | 12/1961 | Waldor | 126/270 |
| 3,436,908 | 4/1969 | Van Delic | 126/270 |
| 3,785,931 | 1/1974 | Coffey et al. | 202/234 |
| 3,847,136 | 11/1974 | Salvail | 126/271 |

Primary Examiner—Carroll B. Dority, Jr.

[57] ABSTRACT

In a preferred embodiment of the invention, a flat-plate solar cell type unit includes a plurality of individual cells in parallel flow arrangement and relationship with one-another, as well as physically being substantially parallel to one-another extending along longitudianl elongated axis thereof, each cell being adjustably intermittently rotatable in a direction around its longitudinal axis, such that the angle of incidence of the sun-light rays is adjustable for each individual cell type unit by rotation around its respective longitudinal axis, the plurality being simultaneously adjustable by an interconnecting lever mechanism.

9 Claims, 8 Drawing Figures

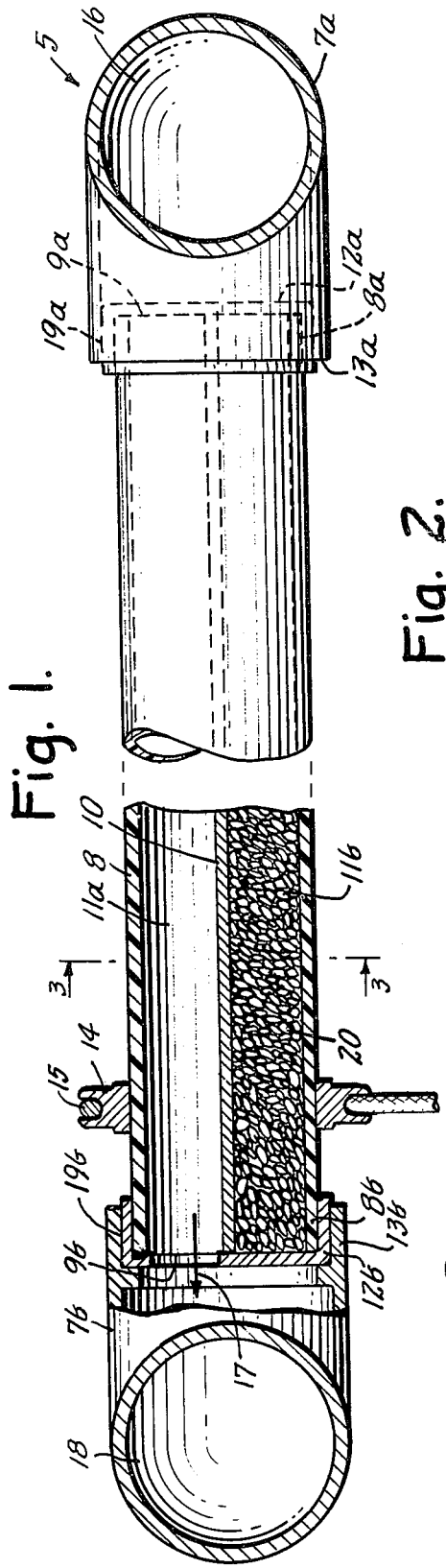
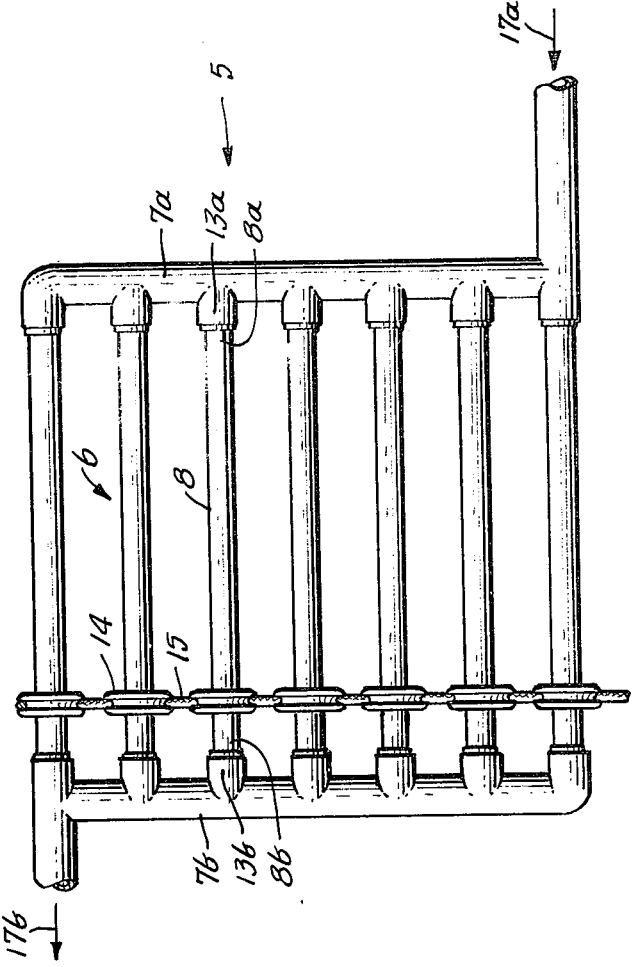
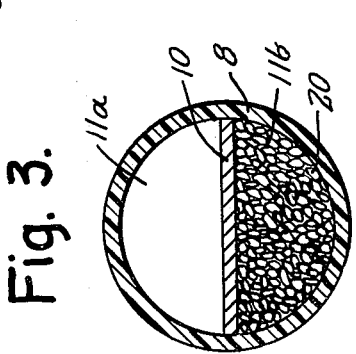
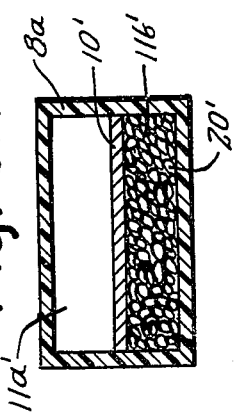

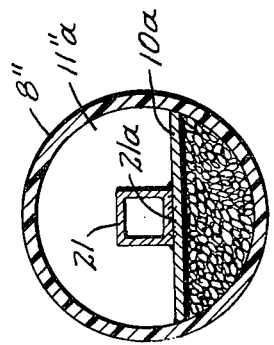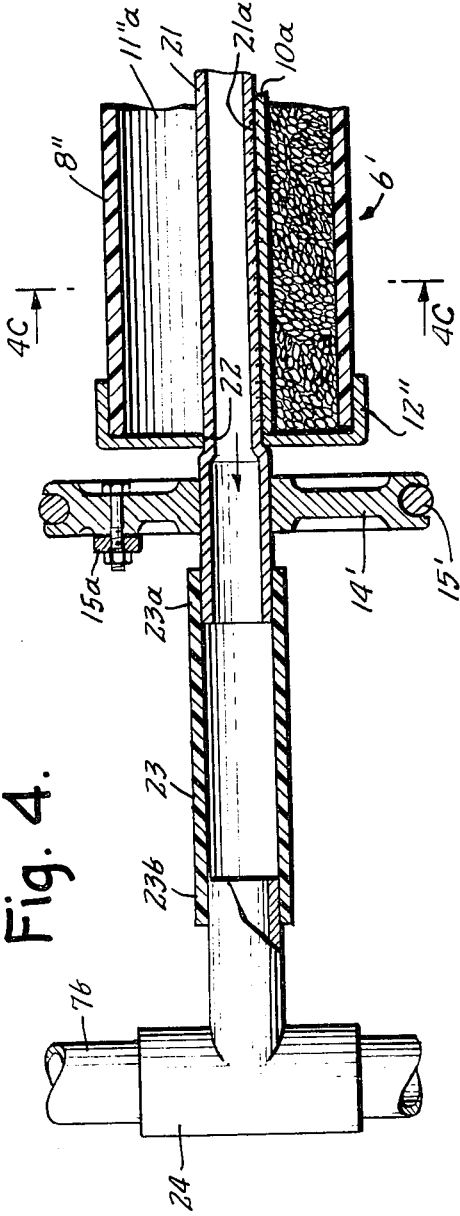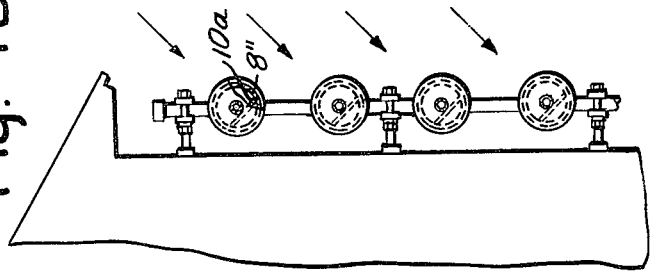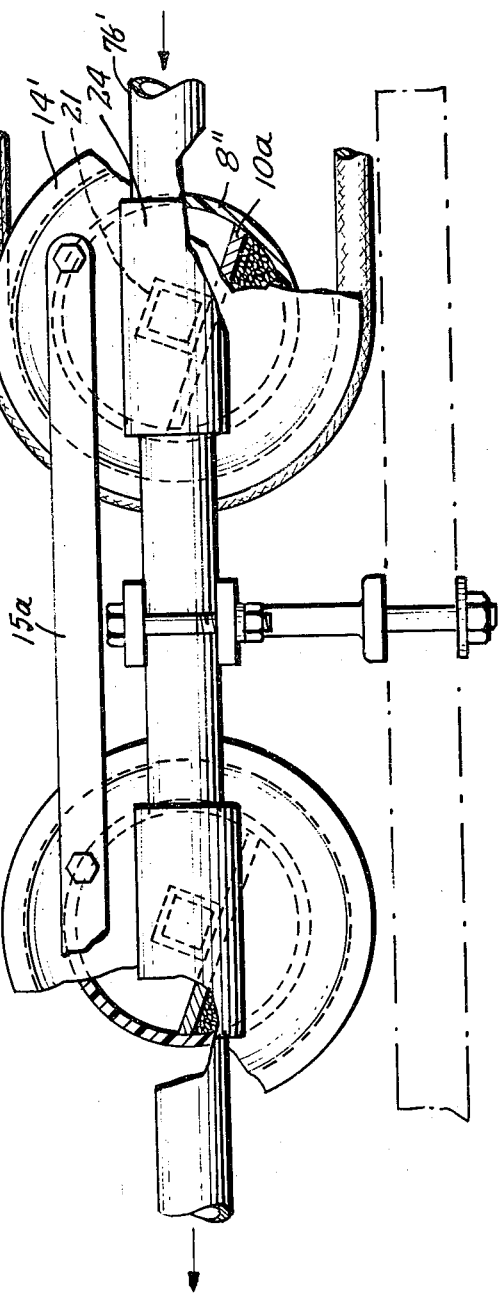

SOLAR HEAT-COLLECTOR DEVICE

This invention relates to an improved solar cell and combination of a plurality thereof.

BACKGROUND OF THE INVENTION

Prior to the present invention, there has been a notorious problem and disadvantage associated with the present solar cell systems of the flat-plate variety especially, in which the efficiency of conversion of received sun-light to heat energy has been, as engineered, in the installation of such systems, compromised as an average of a large number of varying angles of incidence of sunlight rays relative to an upper flat surface of the flat-plate for the twelve months of the year. Accordingly, only typically twice a year is the angle of incidence exactly perpendicular, at the most efficient angle for the solar units as installed. In conjunction with this problem there has been the difficulty and disadvantage of excessive weight and lack of any apparent satisfactory recourse for overcoming the above-noted low efficiency as well as large weight of the units which continually have been composed of a large number of plates and metal pipes held intimately with the respective plates, held all mounted within a common enclosure as a single unit having a plurality of plates and pipes on a common support base, resulting in a size of such largeness and weight as to be extremely bulky and require at least two men to handle a single unit thereof, particularly in view of the very fragile nature of the transparent enclosure glass structure or cover.

Also, a major problem and disadvantage of prior units and systems thereof have been the susceptability of the fragile glass to breakage by the throwing of rocks and the like by children, resulting in very costly maintenance in most instances, replacing broken glass covers.

SUMMARY OF THE INVENTION

Objects of the present invention include the overcoming and/or avoiding of problems and difficulties of the types discussed above, together with novel advantages and units and combinations thereof obtained by the present invention.

Another object, in particular, is to obtain novel single units totally independantly functional from other associated fluid-flow passages and independently rotatable around a longitudinal axis thereof, for thereby adjustment intermittently of the angle of incidence of sunlight rays to sunlight ray-receiving flat-plate elements thereof.

Another object is to provide for simultaneous adjustment of the plurality of individually adjustable novel solar units of the present invention.

Another object is to obtain solar units of higher durability to avoid a common problem of vandalism resulting heretofore in shattering and breaking in the manner referred to above, for example.

Another object is to obtain novel solar units of a functional size and structure and adaptability as to avoid weight and handling problems and difficulties while concurrently being mountable together as a larger unit having individual adjustability of the type provided for in the preceding objects.

Other objects become apparent from the preceeding and following disclosure.

One or more objects above-noted are obtained by the invention as defined herein.

Broadly the invention may be defined as a solar heat-collector device having an elongated tubular enclosure structure transparent to sunlight and housing solar heat-receiving elements and being mounted for rotation around its elongated longitudinal axis such that the angle of incidence of sun-light rays may be intermittently adjusted to optimum degrees at different times of the day and/or at different times of the year, as the case may be. Preferably the unit includes as a system other individual cells also mounted for independent rotation around their respective individual axes, but mounted for parallel flow of fluid through the plurality thereof, and typically and preferably also physically located with axes of their lengths parallel to one-another in side-by-side relationship preferably with a common actuation lever for simultaneously adjusting all of the plurality concurrently to a desired angle of incidence. In a preferred embodiment, the cell is of a flat-plate type, and the fluid flowing within the enclosure in one embodiment is air or other desired gas, and for example may be free-flowing above the plate within the transparent enclosure, or the fluid may be gas or liquid and be channeled through a pipe soldered or fused or otherwise pinned to the plate, typically to an upper surface of the plate but alternatively may run beneath the plate and be embodied within insulation located in both embodients beneath the plate within the tubular enclosing structure. In a preferred embodiment, the tube is totally circumscribing the unit in a direction around the elongated longitudinal axis of the plate and has a cap on each of opposite ends of the tube, with a hole in each cap for passing therethrough the typically water-carrying pipe.

In the embodiment in which heated air exits from the space above the flat plate, no cap is required necessarily on either of opposite ends of the tubular enclosure structure, the tube itself merely being mated typically a a male unit at each of opposite ends into a fractionally larger T-joint tube of a conduit for carrying the heated air to typically a hot-air heating system, and the mountings of the tubular structure at opposite ends in different female conduit openings being mounted therein without set or fixed attachment such that the tube can be easily rotated a predetermined number of degrees in either direction as might be desired to adjust the angle of incidence of sunlight more closely to a perpendicular optimum alignment with light rays being received from the sun. Each tubular structure may have the structure thereof adapted or include mounted thereon adapting structure such that a lever element may be used to rotate the tubular structure the desired number of degrees to and/or fro, and such that also other tubular structures similarly rotatably mounted for individual rotation around its respective axis, any be linked to the actuating lever in order that it is concurrently adjusted rotatably.

In the embodiment(s) having a metal tube pinned or fused to the metal plate, the outlet of the tube may be and preferably is attached to a conduit system by a flexible tube at each of opposite ends such that the flexible tubes at the opposite ends are both twistable at least to an extend permitting the rotational adjustment of the tubular structure the desired predetermined degrees for effecting a positioning of the upper surface of the flat-plate in perpendicular relationship to the sun's rays being received. The upper and lower plate surfaces are preferably black.

A preferred material of the tubular structure is fiber glass from the stand point of the less fragile nature thereof together with the capability thereof to be formed in desired tubular particular shapes, and the transparent nature thereof continually through years of continued use and exposure to the ultraviolet rays of the sun, as well as its suitable nature in ability to withstand the elevated temperatures of the solar cell. In contrast, many plastics may be utilized but generally when economically of low price are characterized by a disadvantage of turning yellow or otherwise discoloring over a number of years of exposure to ultraviolet sunlight rays. Aside from this disadvantage, any of many conventional or other plastic tubular structures may be utilized. Each tubular unit is characterized by typically small diameter and/or thickness and lengths typically ranging from 1 to 7 feet.

The single cells as described above and interconnected pluralities thereof would require merely some minor spaced-apart racks and clamps spacing the tubes a minor distance above the surface of a roof on which it is mounted, or a minor distance from an upright wall along which the total plurality may be mounted, to permit the flow of water, snow, venting air, and the like.

In a further preferred embodiment, the cross-sectional shape of the tubular structure is substantially rectangular, thereby minimizing the free-space and distance of the inner upper surface of the tube above the upper surface of the flat-plate, thus improving efficiency of the unit.

The invention may be better understood by making reference to the following Figures.

THE FIGURES

FIG. 1 illustrates an in-part view in partial cut-away and thus side cross-sectional view of a hot-air conduit cell of the adjustable type of the present invention.

FIG. 2, for the type cell illustrated in FIG. 1, illustrates an elevation plan view of a combination unit of a plurality of the cells with typical conduits providing for input and output gaseous flow to and from each of the separately adjustable units simultaneously adjustable by a common lever mechanism.

FIG. 3 illustrates a cross-sectional view across the tubular cell of FIG. 1 as taken along lines 3—3 thereof.

FIG. 3A illustrates a view analogous to that of FIG. 3, of an alternate and preferred embodiment in which the tubular structure in cross-section thereacross is substantially rectangular in shape.

FIG. 4 illustrates in an in-part view, a side cross-sectional view analagous to that of FIG. 1, except of a different embodiment in which the metal tube is fused to the upper surface of the metal plate and has the opposite ends thereof connected by flexible tubes to the conduit structure T-joint, one at each of opposite ends, however only one end being illustrated. FIG. 4C is taken in cross-section on line 4C—4C of FIG. 4.

FIG. 4A illustrates an in-part view as taken in side view elevation of an entire conduit system and plurality, showing diagrammatically the angles to which the flat-plates, viewable in partial cut-away, have been positioned each individually but all to the same angle as controlled by a common adjusting mechanism, relative to the angle of travel of sun-light rays, as might be the case when such system is mounted on a flat upper face of a flat-roofed house or dwelling.

FIG. 4B illustrates in an identical type view, the system positioned in an upright position beside a house outer-wall, with the individual cells each individually angled, for perpendicular angle of incidence of the sun rays to an upper surface of each flat-plate of the respective cells.

DETAILED DESCRIPTION OF THE INVENTION

In further reference to the embodiments of the above-noted Figures, FIGS. 1, 2, 3 and 3A relate to a common-type embodiments. FIGS. 4, 4A, 4B, and 4C all relate to a different embodiment. However, the arrangements of the systems as illustrated in FIGS. 4A and 4B apply equally to the embodiments of the other FIGS. 1, 2, 3, and 3A also.

As to FIG. 1, illustrates a hot-air solar heat system 5, with flat-plate solar cell unit 6 mounted between input conduit 7a and output conduit 7b. The flat-plate solar cell unit 6 includes the tube 8 which is transparent to sun-light rays and which has openings 9a and 9b at opposite open ends thereof with the plate of metal as plate 10 dividing the interior space into upper space 11a and lower space 11b, with insulation typically polyurethane pellets 20 in space 11b, sealed at opposite ends by caps 12a and 12b which caps are optional. Junction conduit tubes as female union joints 13a and 13b receive male member opposite tube ends 8a and 8b respectively in a snug but unsealed relationship preferably in order to provide for movement rotatably of the tube around its elongated longitudinal axis. Accordingly, the surfaces of the outside of the tube ends 8a and 8b are slidable rotatably with the inner circumscribing surfaces of the female union joints 13a and 13b respectively at slide points 19a and 19b respectively therebetween, with a sufficiently snug fit as to prevent any significant loss of air or other gas thereat. Mounted on the outer surface or as a part thereof of the tube 8, is the lever structure and associated lever 14 and 15 respectively. Hot air typically is furnished by inlet conduit 7a through inlet conduit space 16 from which space the cool air flows into space 11a in direction 17 onward into outlet conduit space 18. Any desired or suitable conventional metal or alloy may be utilized for the plate 10.

FIG. 2 in an elevation view thereof, discloses the system 5 with the plurality of individually rotatable units 6 mounted in parallel with one-another and for parallel flow of inlet gas 17a and outlet gas 17b directions respectively.

FIG. 3 is a cross-sectional view taken along lines 3—3 of FIG. 1, better illustrating the elements previously described.

FIG. 3A illustrates an alternate and preferred embodiment, as compared to FIG. 3 embodiment, in which the tubular wall structure 8a is substantially rectangular in its cross-section, thus defining a rectangular space 11a' and 11b' by the plate 10', and having insulation 20' in space 11b'.

FIG. 4 illustrates a different and preferred embodiment of the invention, in which a metal tube (or pipe) 21 is fused (or welded) at point 21a to plate-upper surface of plate 10a. Tube cap 12'' includes off-set aperture 22 with (pipe) tube 21 extending therethrough and tube end 21b having plastic tube 23 mounted between T-joint 24 male union joint end 24a within plastic tube end 23b and with tube end 21b within tube end 23a, such that lever 15' action on lever structure 14' mounted on the tube end 21b serves by lever arm(s) 15a to rotate the entire unit solar cell unit 6' a minor number of degrees needed to adjust angle of incidence of sun-light rays relative to the upper surface of plate 10a. FIG. 4C illustrates the interior of the cell in cross-section, especially better illustrating the fused relationship between the tube 21 and the plate 10a. At this point it should be noted that the composition of the metal and/or alloy plate and tube 21, may be of any desired or conventional materials. However, if corrosion is to be avoided, it is preferred — in order to maintain a high efficiency of the solar cell, that the plate and tube respectively be of chemically compatible metals and/or alloys. In particular, the plate and tube may be both copper, or both aluminum, or copper plate with aluminum pipe, or aluminum plate with copper pipe, or galvanized plate and copper tube which can be soldered to galvanized steel, this latter embodiment and also the embodiment in which both the plate and pipe are copper being preferred embodiments.

In another embodiment not illustrated, the space 11a and/or 11''a may be sub-divided into upper and lower spaces by a mere angular section of an elongated side of a transparent tube, curved in the direction circumscribing the elongated longitudinal axis thereof, placed to be supported on the upper edges of the plate 10 and/or 10a to thereby further insulate the space closest to the plate's upper surface from the sub-divided outer most sub-space, preventing heat loss, and thereby further improving efficiency.

It is within the scope of the present invention to make such other changes and modifications as would be apparent to a person of ordinary skill in this particular field.

I claim:

1. A solar heat-collector device comprising in combination: an elongated tubular means for housing solar heat elements and for providing a transparent housing wall receivable of light rays therethrough; adjustable mounting means for rotatably supporting said elongated tubular means rotatably around a longitudinal axis of the elongated tubular means such that the elongated tubular means may be altered to and fro intermittently for adjusting the position thereof for receipt of said light rays at variable angles relative to a fixed position of the adjustable mounting means; the elongated tubular means defining a substantially lineally extending transparent tube open at at-least one end thereof and defining therein a continuous channel between and including inlet and outlet structures for conductance of fluid therethrough, and solar heat elements including a substantially elongated metal plate within the tube positioned to substantially segregate the channel into upper and lower spaces and insulation elements positioned below said elongated metal plate within the lower space.

2. A solar heat-collector device of claim 1, including conduit means for providing passages and connected to each of said inlet and outlet structures providing for conductance of said fluid to said inlet structure and from said outlet structure.

3. A solar heat-collector device of claim 2, in which said adjustable mounting means includes a lever element for effecting the rotating of the elongated tubular means.

4. A solar heat-collector device of claim 3, in which said adjustable mounting means comprises at least one matting tube and the elongated tubular means includes an outlet structure and the inlet structure in matting relationship with the mating structure in fluid-sealed relationship with the inlet and outlet structures slidably rotatable against and relative to the mating structure such that the elongated tubular means is rotatable.

5. A solar heat-collector device of claim 4, in which said transparent tube includes opposite open ends defined by said inlet and outlet structures respectively, and air being a heat transfer fluid flowable through and being within said transparent tube and said conduit means.

6. A solar heat-collector device of claim 2, in which said transparent tube includes opposite open ends defined by said inlet and outlet structures respectively, and a metal conduit mounted in intimate contact with and extending along a longitudinal axis of said elongated metal plate and in closed-circuit communication with and extending between said inlet and outlet structures respectively providing for serial passage of fluid therethrough from said inlet structure to said outlet structure.

7. A solar heat-collector device of claim 6, in which said adjustable mounting means includes flexible tubing one at each of opposite ends of the transparent tube, one piece of the flexible tubing connected to said inlet structure and another piece of the flexible tubing connected to said outlet structure, and said conduit means including conduit passage structure leading and connected to and from said one piece and said another piece respectively providing for rotation of the transparent tube rotatably by concurrent twisting each of said one piece and said another piece respectively as the transparent tube is rotated.

8. A solar heat-collector device of claim 7, including a plurality of said elongated tubular means mounted in substantially parallel relationship relative to elongated axis thereof as mounted by said adjustable mounting means.

9. A solar heat-collector device of claim 8, in which said adjustable mounting means includes a lever element for effecting simultaneous rotary adjustment of said plurality.

* * * * *